United States Patent Office 3,234,241
Patented Feb. 8, 1966

3,234,241
PROCESS FOR PREPARING 2,2,4,4-TETRAALKYL-3-HYDROXY-3-BUTENOIC ACID β-LACTONES
Edward U. Elam, Kingsport, Tenn., assignor to Eastman Kodak Company, Rochester, N.Y., a corporation of New Jersey
No Drawing. Filed Nov. 4, 1963, Ser. No. 321,280
9 Claims. (Cl. 260—343.9)

This invention relates to a process for the preparation of β-lactones, and more particularly to a process for the preparation of β-lactones by dimerization of dialkylketenes in the presence of organic trivalent phosphorus derivative catalysts including organic phosphine, phosphite, phosphonite or phosphinite catalysts.

The process is carried out according to the following reaction:

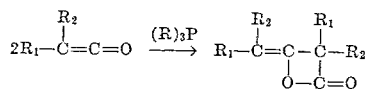

wherein $R_1$ and $R_2$ each represent lower alkyl groups of from 1 to 4 carbon atoms, such as methyl, ethyl propyl, isopropyl and butyl as present in lower dialkylketenes such as dimethylketene, or $R_1$ and $R_2$ are joined alkylene groups which together with the carbon atom to which they are attached represent a saturated carbocyclic ring of 5 to 6 carbon atoms, e.g. as in tetramethylene ketene and pentamethylene ketene. $(R)_3P$ represents an organic trivalent phosphorus derivative catalyst including a phosphine, phosphite, phosphinite or phosphonite catalyst in which R represents either lower alkyl of 1 to 4 carbon atoms such as present in the trialkylphosphines such as trimethyl, triethyl, tripropyl and tributyl phosphines, e.g. tributylphosphine $(C_4H_9)_3P$; or R represents lower alkoxy of 1 to 4 carbon atoms, such as present in trialkyl phosphites, such as trimethyl, triethyl, tripropyl and tributyl phosphites, e.g. triethylphosphite $(C_2H_5O)_3P$ (dialkyl phosphites which are pentavalent phosphorus derivatives are not useful); or R represents a benzene radical including phenyl and substituted phenyl such as present in the triarylphosphines, e.g. triphenyl phosphine $(C_6H_5)_3P$ and tri(chlorophenyl)phosphine $(Cl—C_6H_4)_3P$; or R represents a benzoxy radical such as present in triarylphosphites, e.g. triphenylphosphite $(C_6H_5O)_3P$ and tri(chlorophenoxy)phosphite $(Cl—C_6H_4O)_3P$, or in $(R)_3P$ at least one R can be lower alkoxy and the other two are benzene radicals such as present in mixed alkyl aryl phosphinites, e.g. butyl diphenylphosphinite, $(C_6H_5)_2POC_4H_9$, or at least one R can be a benzene radical and the other two lower alkoxy groups such as present in alkyl aryl phosphonites, e.g. dibutylphenyl phosphonite, $(C_4H_9O)_2PC_6H_5$. Phosphorous halides are too active for use as catalysts in the process.

The trialkylphosphines and triarylphosphines are especially useful as catalysts in the reaction although somewhat more polymerization is obtained using the phosphines with the lower molecular weight dialkylketenes such as dimethylketene.

The process is carried out by using catalytic amounts of the phosphine or phosphite compounds $(R)_3P$ and allowing the reaction mixture to stand at room temperature or at elevated temperature until dimerization is complete after which the dimer can be isolated by distillation especially under reduced pressure as illustrated in the examples below. If desired, the reaction can be run at sub- or superatmospheric pressure but satisfactory results are obtainable by conducting the reaction at atmospheric pressure.

The phosphine and phosphite catalysts can be used in catalytic amounts of from about 1% or less of the weight of the charged ketene to an equimolecular or larger amount. A preferred concentration is about 1 to 5% based on the amount of ketene used.

Reaction temperatures of from about 25° C. to the boiling point of the lactone are useful, especially 50 to 175° C.

There are a substantial number of organic solvents which can be used in the reaction, but are generally not required and the β-lactones produced in the process are excellent solvents. Suitable solvents can be selected from the class of hydrocarbons, ethers, esters, ketones and nitriles, e.g., diethyl ether, tetrahydrofuran, tetrahydropyran, diisopropyl ether, ethylene dichloride, dioxane, benzene, toluene, xylenes, ethylbenzene, chlorobenzene, acetonitrile, ethyl acetate, isopropyl acetate, isobutyl acetate, methyl isobutyrate, di(2-ethylhexyl)phthalate, acetone, methyl isoamyl ketone, and the like.

Mixed β-lactones produced in the process by dimerization of mixtures of dialkylketenes are contemplated by the invention. Thus, a mixture of dimethyl and diethylketenes yields a β-lactone of the above formula where one pair of $R_1$ and $R_2$ groups are methyl groups and the other pair are ethyl groups.

Representative dialkylketenes of formula $R_1R_2C=C=O$ are for example dimethylketene, ethylmethylketene, diethylketene, methylpropylketene, isobutylethylketene, butylethylketene, tetramethyleneketene and pentamethyleneketene.

The following examples will serve to illustrate the invention.

Example 1

Five grams of triethyl phosphite were placed in a 1-liter three-necked flask which was fitted with a Dry Ice-cooled reflux condenser, thermometer, inlet for dimethylketene, and a magnetic stirrer. Stirring was started and dimethylketene was passed in. A strongly exothermic reaction occurred and the temperature rose spontaneously to 90 to 100° C. and remained there until the dimethylketene stream was shut off. A total of approximately 300 grams of product had collected. Gas chromatographic analysis of this crude product indicated that it contained 97% of 3-hydroxy-2,2,4-trimethyl-3-pentenoic acid β-lactone and 3% of tetramethyl-1,3-cyclobutanedione. Distillation gave, after removal of a small amount of low-boilers containing tetramethyl-1,3-cyclobutanedione, and 15 ml. of forecut, B.P. 76.5–78.5° C. (25 mm.), $n_D^{20}$ 1.4368, 235 ml. of pure 3-hydroxy-2,2,4-trimethyl-3-pentenoic acid β-lactone, B.P. 78.5–9° C. (25 mm.), $n_D^{20}$ 1.4380, the infrared spectrum of which was identical with that of authentic material. Volume of the residue was 20 ml. The lactone has the formula

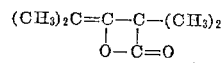

Example 2

The procedure of Example 1 was repeated except that 5 g. of triphenyl phosphite $(C_6H_5O)_3P$ was used as the catalyst. The generator was shut down after about 250 ml. of dimethylketene had been collected. The reaction in this case was only slightly exothermic and some solid tetramethyl-1,3-cyclobutanedione was formed. The liquid present was taken up in ether and separated from the solid by filtration. Gas chromatography of the filtrate indicated that 3-hydroxy-2,2,4-trimethyl-3-pentenoic acid β-lactone was present.

*Example 3*

The procedure of Example 1 was repeated with 5 g. of triphenylphosphine $(C_6H_5)_3P$ dissolved in 50 ml. of xylene as the catalyst. A quantity of sticky polymer was formed in this reaction, but gas chromatography of the liquid portion of the product indicated that 3-hydroxy-2,2,4-trimethyl-3-pentenoic acid β-lactone was also present.

*Example 4*

Ten grams of triethyl phosphite $(C_2H_5O)_3P$ was placed in a 250 ml. three-necked flask equipped with a magnetic stirrer, reflux condenser, thermometer, and a dropping funnel, and 100 g. of butylethylketene was added gradually. An initial highly exothermic reaction carried the temperature to 140° C. The mixture was heated to 165–70° C. overnight. Distillation of the product gave 71 g. boiling from 121–6° C. at 2.5–3 mm., $n_D^{20}$ 1.4551–1.4554. The infrared absorption spectrum of this material indicated that it was 2-butyl-2,4-diethyl-3-hydroxy-3-octenoic acid β-lactone, having the formula

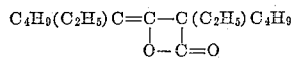

*Example 5*

The procedure of Example 3 was repeated except using 5 g of tributylphosphine as the catalyst to obtain some 3-hydroxy-2,2,4-trimethyl-3-pentenoic acid β-lactone and considerable polymer. Mono- and dibutylphosphine give similar results.

*Example 6*

The procedure of Example 1 was followed except using 5 ml. of phenyl didecyl phosphite as the catalyst. The reaction was stopped after about 100 ml. of dimethylketene had been passed into the reaction flask. A highly exothermic reaction occurred which carried the reaction temperature above 100° C. On cooling, 2,2,4,4-tetramethyl-1,3-cyclobutanedione crystallized from the mixture. The reaction product was diluted with benzene and the resulting solution analyzed by gas chromatography showing that 3-hydroxy-2,2,4-trimethyl-3-pentenoic acid β-lactone was present.

*Example 7*

The procedure of Example 3 was followed except using 5 ml. of diphenyl decyl phosphite as catalyst. A smaller amount of 3-hydroxy-2,2,4-trimethyl-3-pentenoic acid β-lactone was formed.

*Example 8*

The procedure of Example 6 was followed except using 5 ml. of dibutyl phenyl phosphonite, $(C_4H_9O)_2PC_6H_5$, as the catalyst. The product contained 89% of 3-hydroxy-2,2,4-trimethyl-3-pentenoic acid β-lactone and 11% of 2,2,4,4-tetramethyl-1,3-cyclobutanedione.

*Example 9*

Substitution of butyl diphenylphosphinite $(C_6H_5)_2POC_4H_9$ as the catalyst in the procedure of Example 8 gives similar results.

*Example 10*

A sample of pentamethyleneketene was dimerized in the presence of a catalytic amount of triethyl phosphite. The characteristic absorption bands of an unsaturated β-lactone were detected in the infrared spectrum of the reaction product.

*Example 11*

Approximately 5 ml. of freshly distilled butylethylketene was placed in a test tube and a drop of the organic trivalent phosphorus derivative catalyst, hexamethylphosphorous triamide, $P[N(CH_3)_2]_3$, was added. The mixture became hot and gradually set to a sticky solid. Although this material was mostly polymeric, its infrared spectrum contained a band at 5.35μ, which is a highly characteristic feature of the spectra of 2,2,4,4-tetraalkyl-3-butenoic acid β-lactones. In addition to this band, all of the principal bands of the spectrum of an authentic specimen of the β-lactone dimer of butylethylketene were present. Similar results are obtained by using the amides of phosphonous acid, such as $C_6H_5P(NC_5H_{10})_2$, and of phosphinous acid, such as $C_6H_5(4\text{-MeC}_6H_4)PNHC_6H_5$, as catalysts for the dimerization In the manner of the above examples the other lower dialkyl ketenes and mixtures of different dialkyl ketenes can be used to produce the corresponding 3-hydroxy-2,2,4-trialkyl-3-alkenoic β-lactones using the organic trivalent phosphorus compounds, especially the phosphines and phosphites, phosphinites and phosphonites described above as catalysts.

The invention has been described in considerable detail with particular reference to certain preferred embodiments thereof, but it will be understood that variations and modifications can be effected within the spirit and scope of the invention as described hereinabove, and as defined in the appended claims.

What I claim is:

1. A process of preparing a β-lactone which comprises contacting a disubstituted ketene having the general formula

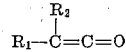

wherein R and $R_1$ are selected from the class consisting of lower alkyl and alkylene groups which together with the carbon atom to which they are attached form a saturated carbocyclic ring of 5 to 6 carbon atoms, with a catalytic amount of a member of the class consisting of phosphine, phosphite, phosphinite and phosphonite compounds having the formula

wherein R represents a member of the class consisting of lower alkyl, lower alkoxy, a benzene radical and a benzoxy radical.

2. A process of preparing a β-lactone which comprises contacting a lower dialkylketene with a catalytic amount of a lower trialkylphosphine.

3. A process of preparing a β-lactone which comprises contacting dimethylketene with a catalytic amount of tributylphosphine thereby forming 3-hydroxy-2,2,4-trimethyl-3-pentenoic acid β-lactone.

4. A process of preparing a β-lactone which comprises contacting dimethylketene with a catalytic amount of triphenylphosphine thereby forming 3-hydroxy-2,2,4-trimethyl-3-pentenoic β-lactone.

5. A process of preparing a β-lactone which comprises contacting dimethylketene with a catalytic amount of triphenylphosphine thereby forming 3-hydroxy-2,2,4-trimethyl-3-pentenoic β-lactone.

6. A process of preparing a β-lactone which comprises contacting a lower dialkylketene with a catalytic amount of a lower trialkylphosphite.

7. A process of preparing a β-lactone which comprises contacting dimethylketene with a catalytic amount of triethylphosphite thereby forming 3-hydroxy-2,2,4-trimethyl-3-pentenoic β-lactone.

8. A process of preparing a β-lactone which comprises contacting butylmethylketene with a catalytic amount of triethylphosphite thereby forming 2-butyl-2,4-diethyl-3-hydroxy-3-octenoic β-lactone.

9. A process for preparing a β-lactone which comprises contacting a lower dialkylketene with a catalytic amount of dibutyl phenyl phosphonite.

References Cited by the Examiner

UNITED STATES PATENTS 3,062,836  11/1962  Martin _____ 260—343.9

OTHER REFERENCES

Cram et al.: Organic Chemistry, McGraw-Hill Book Co., New York (1959), page 179.

Mellor's Modern Inorganic Chemistry, Longmans, Green and Co., New York (1939), pages 761–764.

WALTER A. MODANCE, *Primary Examiner.*

NICHOLAS S. RIZZO, *Examiner.*